(12) United States Patent
Brück et al.

(10) Patent No.: US 6,513,324 B2
(45) Date of Patent: Feb. 4, 2003

(54) DEVICE WITH HEATING ELEMENT FOR EXHAUST GAS CLEANING

(75) Inventors: Rolf Brück, Bergisch Gladbach (DE); Friedrich-Wilhelm Kaiser, Neunkirchen-Seelscheid (DE); Hubertus Kotthoff, Ruppichteroth (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 10/096,694

(22) Filed: Mar. 13, 2002

(65) Prior Publication Data

US 2002/0092298 A1 Jul. 18, 2002

Related U.S. Application Data

(63) Continuation of application No. PCT/EP00/08597, filed on Sep. 1, 2000.

(30) Foreign Application Priority Data

Sep. 13, 1999 (DE) ......................................... 199 43 846

(51) Int. Cl.[7] .................................................. F01N 3/10
(52) U.S. Cl. ............................. 60/300; 60/299; 60/303; 422/174; 422/177
(58) Field of Search .......................... 60/299, 300, 301, 60/303; 422/173, 174, 177, 186.2, 179, 180, 181

(56) References Cited

U.S. PATENT DOCUMENTS

| | | |
|---|---|---|
| 5,254,840 A | 10/1993 | Thompson |
| 5,417,062 A | 5/1995 | Swars et al. |
| 5,422,082 A * | 6/1995 | Yoshizaki et al. .......... 422/174 |
| 5,514,347 A * | 5/1996 | Ohashi et al. .............. 422/174 |
| 5,554,342 A * | 9/1996 | Hirayama et al. .......... 422/174 |
| 5,632,961 A * | 5/1997 | Sheller ........................ 422/180 |
| 5,768,889 A | 6/1998 | Maus et al. |
| 5,800,787 A * | 9/1998 | Kato et al. .................. 422/174 |

FOREIGN PATENT DOCUMENTS

| | | | |
|---|---|---|---|
| EP | 0 557 309 B1 | 9/1993 | |
| EP | 0 783 621 B1 | 7/1997 | |
| FR | 2 771 449 A1 | 5/1999 | |
| JP | 406254413 A * | 9/1994 | ............... 60/303 |

* cited by examiner

Primary Examiner—Thomas Denion
Assistant Examiner—Binh Tran
(74) Attorney, Agent, or Firm—Laurence A. Greenberg; Werner H. Stemer; Gregory L. Mayback

(57) ABSTRACT

A device for cleaning exhaust gas from an internal combustion engine, especially a diesel engine, includes at least one catalyst carrier body through which an exhaust gas can flow. The catalyst carrier body is disposed in a casing tube and has a honeycomb-shaped structure. An electrical heating element has a supply terminal at each end and a twisted current path over an electrically insulating gap in the heating element. The heating element is a honeycomb body which is fixed to the catalyst carrier body by electrically insulating support elements and which is located downstream of the catalyst carrier body in exhaust gas flow direction. A honeycomb body, especially a particle filter, situated downstream, may be heated particularly effectively and a temperature required there may be reached and/or maintained, especially for igniting soot that has collected.

13 Claims, 1 Drawing Sheet

DEVICE WITH HEATING ELEMENT FOR EXHAUST GAS CLEANING

CROSS-REFERENCE TO RELATED APPLICATION

This application is a continuation of copending International Application No. PCT/EP00/08597, filed Sep. 1, 2000, which designated the United States.

BACKGROUND OF THE INVENTION

Field of the Invention

The present invention relates to a device for emission control or cleaning of exhaust gas from an internal combustion engine, in particular a diesel engine. At least one catalyst carrier body, through which the exhaust gas can flow, has a honeycomb structure and is disposed in a casing tube. An electrical heating element has a power connection at each of its ends and a twisting current path is established in the heating element over an electrically isolating gap.

Such a device is known, for example, from European Patent EP 0 783 621 B1, corresponding to U.S. Pat. No. 5,768,889. Applicant's brochure entitled "Elektrisch Heizbarer Katalysator Emicat" [Emicat Electrically Heatable Catalytic Converter], which deals at length with the history of the development of heatable honeycomb bodies and their structure, also contains extensive information.

The known configurations are based essentially on the concept that the heatable honeycomb body is disposed upstream of a catalyst carrier body in flow direction, in order to ensure that it can rapidly heat up the latter when required. In that respect, the known configurations are based on the concept that the cross-sectional area should be heated as homogeneously as possible, so that the electrically isolating gap is kept small and by far the greatest part of the cross-sectional area is heated.

Although it is already known from European Patent EP 0 557 309 B1, corresponding to U.S. Pat. No. 5,417,062, to place a heatable honeycomb body downstream of a catalyst carrier body, that concept is based on the realization that the first slice of a catalytic converter configuration ages during its lifetime as result of high temperatures and other processes. In other words, it is impaired in its catalytic activity, for which reason it is only a region further downstream that is heated. It is also intended in that manner to compensate for what is known as poisoning of the first slice of the catalytic converter configuration by certain components in the fuel.

Concepts are also known in which a cross section that in principle is uniformly filled with electrically heatable sheet-metal layers or metallic structures is heated unevenly by special measures, in particular by producing certain hot regions (hot spots). Such concepts require a relatively complicated production technique to create structures which have a higher electrical resistance at certain locations and a lower electrical resistance at other locations.

In the case of electrically heatable honeycomb bodies in exhaust systems of internal combustion engines, which are intended to heat up other components, it is not only a matter of homogeneously or inhomogeneously heating up a honeycomb body to certain temperatures. In particular, it is also a matter of giving off the heating output to a downstream component and/or the exhaust gas flowing through.

A simple heating wire, for example, could not give off sufficient heat due to its small surface area. In order to heat up a downstream honeycomb body to a certain minimum temperature, for example for burning off accumulated particulates or for triggering a catalytic reaction, a heatable honeycomb body must therefore not only reach the necessary temperature itself but also be able to give off that heat to the exhaust gas or to a downstream honeycomb body.

SUMMARY OF THE INVENTION

It is accordingly an object of the invention to provide a device with a heating element for cleaning exhaust gas from an internal combustion engine, which overcomes the hereinafore-mentioned disadvantages of the heretofore-known devices of this general type, which permits rapid and effective heating of a downstream element, especially a particulate filter and which at the same time is mechanically stable and able to be operated with a current intensity suitable for motor vehicles.

With the foregoing and other objects in view there is provided, in accordance with the invention, a device for cleaning exhaust gas from an internal combustion engine, in particular a diesel engine, comprising a casing tube. At least one catalyst carrier body through which exhaust gas can flow in a flow direction, is disposed in the casing tube and has a honeycomb structure. An electrically heating honeycomb body is disposed downstream of the at least one catalyst carrier body in the exhaust gas flow direction. The honeycomb body has ends and power connections each disposed at a respective one of the ends. The honeycomb body defines a twisting current path over an electrically isolating gap. The honeycomb body has a first cross-sectional area, the gap has a second cross-sectional area, and the first and second cross-sectional areas are in a ratio of less than 2. Electrically insulating supporting elements fasten the honeycomb body to the at least one catalyst carrier body.

The honeycomb body has a large surface area, so that good heat transfer to the exhaust gas flowing through is ensured. The heat being generated can be transferred rapidly to the exhaust gas or a downstream component as a result and by radiation. A heating output possibly given off by radiation to the catalyst carrier body disposed upstream in the direction of the exhaust gas is in turn given off from this body to the exhaust gas, so that the full heating output is available for the downstream component.

In accordance with another feature of the invention, the honeycomb body is shaped in such a way that the current path has an approximately meandering or spiraling form.

In a particularly preferred embodiment, the gap is very much larger than in the known configurations, as described in particular in the "Elektrisch Heizbarer Katalysator Emicat" [Emicat Electrically Heatable Catalytic Converter] brochure cited above. In the device according to the invention, the structure in principle corresponds to the "Heating Catalyst Series 6" shown therein. However, firstly the configuration is the other way around with respect to the direction of flow and secondly the electrically isolating gap is very much larger than in the case of known devices.

In accordance with a further feature of the invention, the ratio of the cross-sectional area of the heatable honeycomb body to the cross-sectional area of the gap is less than 1. That means that the width of the gap is larger than the width of the heatable honeycomb body which forms the twisting current path.

Nevertheless, the electrical properties of the heating element can still be set as desired. If a constant typical extent of the heating element of 5 to 20 mm in the flow direction is assumed, in particular 10 mm, an enlargement of the gap width means that the length of the current path in the heating element must be shortened and/or that the number of parallel sheet-metal layers in the current path must be reduced and/or that the size of the cells in the current path must be reduced. It is especially the last of the possibilities mentioned which allows more heating output to be introduced into partial streams of the exhaust gas which pass through the heating element (and not through the gap), given the same heating output (the electrical resistance does not change significantly as a result of a reduction of the cells but with all of the other parameters staying the same). Hot streaks that are produced in this way can partially heat up a downstream component, which is particularly favorable for the setting off of a catalytic reaction or in particular for the ignition of particulates accumulated in a particulate filter.

In accordance with an added feature of the invention, the gap in the heatable honeycomb body may have either a width which is approximately the same over its extent, whereby hot partial streams are produced in all of the cross-sectional regions, or the gap may have a width which increases in the direction of the casing tube. The latter is adapted to the typical flow distribution in an exhaust system, so that more heating output can be created in the interior of the system than in the outer regions.

In accordance with an additional feature of the invention, in order to avoid oscillations of the current path, preferred by the invention to be very narrow, the supporting elements are distributed between the heating element and the catalyst carrier body at approximately equal intervals over the current path.

In accordance with yet another feature of the invention, the catalyst carrier body serving as a support for the heating element typically has a catalytically active coating which promotes the oxidation of constituents in the exhaust gas, in particular of carbon monoxide and hydrocarbons. The heatable honeycomb body is also preferably provided with such a catalytically active layer, in particular with a layer having an oxidizing action.

In accordance with yet a further feature of the invention, the heatable honeycomb body has honeycombs which are smaller than honeycombs of the catalyst carrier body. In particular, a cell density of 200 to 500 cpsi (cells per square inch) is preferred for the catalyst carrier body and a cell density of 400 to 800 cpsi is preferred for the heatable honeycomb body. In this case, the heatable honeycomb body is constructed in particular from alternate layers of slightly corrugated metal sheets and highly corrugated metal sheets.

In accordance with a concomitant feature of the invention, the device according to the invention is especially suitable in combination with a downstream particulate filter, which may in particular also be a ceramic filter. A heating body of the type described cannot be supported on a ceramic filter without problems, since the coefficients of expansion of metal and ceramic are too different. The described construction of a heating element supported downstream of an oxidation catalytic converter is therefore suitable in particular for such an overall configuration.

Other features which are considered as characteristic for the invention are set forth in the appended claims.

Although the invention is illustrated and described herein as embodied in a device with a heating element for exhaust gas cleaning, it is nevertheless not intended to be limited to the details shown.

Various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
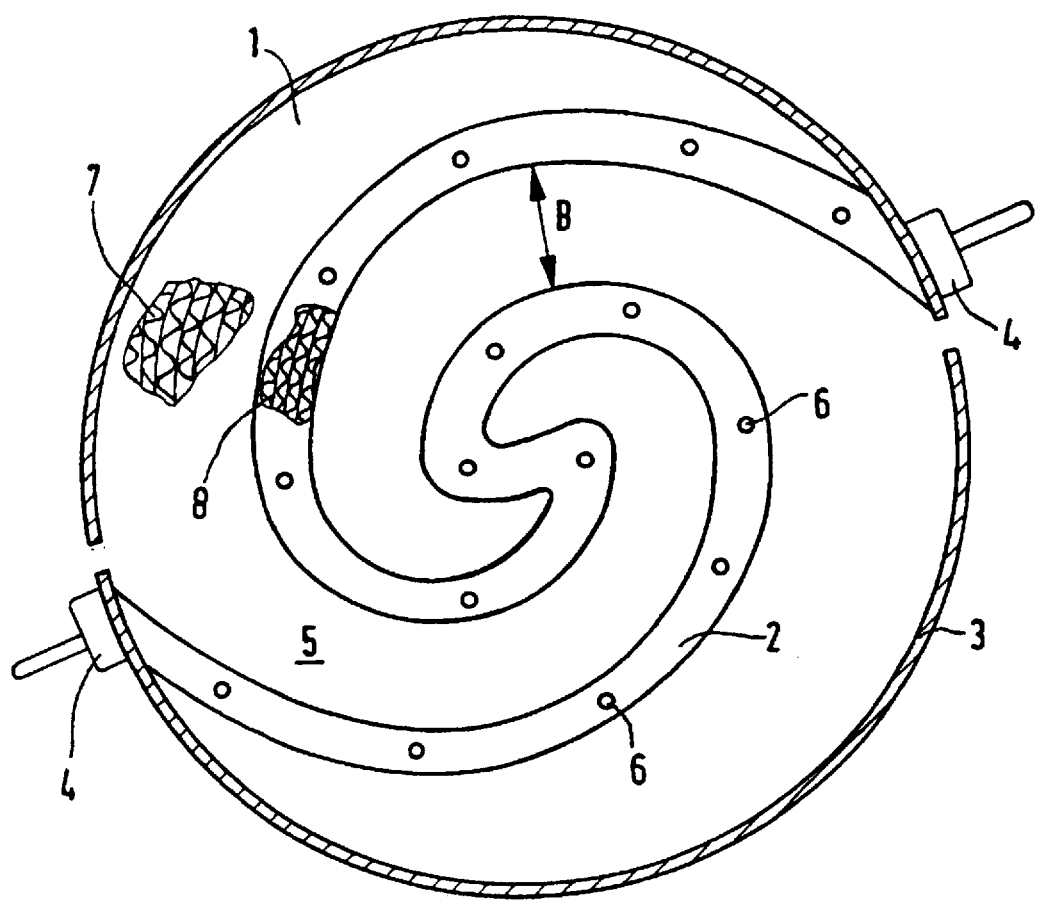
FIG. 1 is a simplified, diagrammatic, sectional view of a catalytic converter device with a honeycomb body twisted in the shape of an S.

Referring now to the figures of the drawings in detail and first, particularly, to FIG. 1 thereof, there is seen an exemplary embodiment of the invention, in which a catalyst carrier body 1 and a honeycomb body 2 are disposed in a casing tube 3. The honeycomb body 2 serves as an electrical heating element with a respective power connection 4 at each of its ends and establishes a twisting, meandering or winding current path along an isolating gap 5. The honeycomb body 2 has a first cross-sectional area and the gap 5 has a second cross-sectional area. The ratio of the first cross-sectional area to the second cross-sectional area is smaller than 2. The gap 5 has a width B which increases in the direction of the casing tube 3 or remains substantially constant over its entire extent. The honeycomb body 2 is fastened to the catalyst carrier body 1 through the use of electrically insulating supporting elements 6. The honeycomb body 2 is disposed downstream of the catalyst carrier body 1 in flow direction of the exhaust gas, as can be seen from FIG. 2, and is provided with a catalytically active layer. The supporting elements 6 are disposed in such a way that they are distributed at approximately equal intervals over a current path of the honeycomb body 2. In the exemplary embodiment shown in FIG. 1, non-illustrated metal pins are provided as the supporting elements 6. The supporting elements 6 prevent oscillations and electrical short-circuits. The exhaust gas flowing out of the catalyst carrier body 1 flows in one part past the honeycomb body 2 and in another part through the honeycomb body 2. This other part is heated up by the large surface of the heating element 2 and, as a result, can heat up a downstream component, likewise in partial regions.

The catalyst carrier body 1 and the honeycomb body 2 are formed of smooth and corrugated sheet metal layers, forming honeycombs. The honeycombs 8 of the honeycomb body 2 may be smaller than or the same size as the honeycombs 7 of the catalyst carrier body 1.

Figure 2:
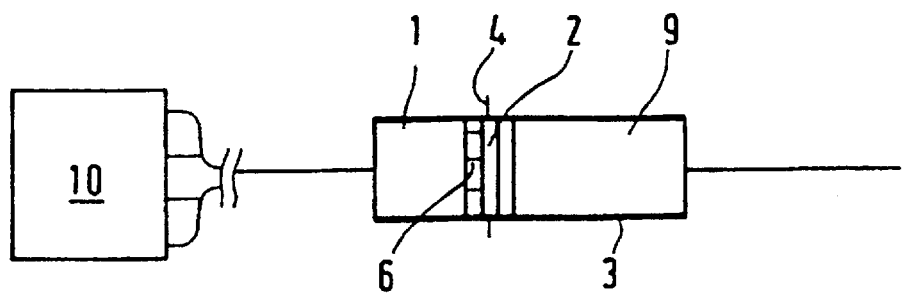
FIG. 2 is a diagrammatic and schematic view of an exhaust system with a device according to the invention.

In principle, FIG. 2 shows the configuration of the device according to the invention in an exhaust system of an internal combustion engine 10. Exhaust gas from the internal combustion engine 10 flows firstly through the catalyst carrier body 1, then the honeycomb body 2 and then a downstream component or further honeycomb body 9, especially a particulate filter. The downstream component may also have a larger diameter than the heatable honeycomb body, in contrast to that represented herein.

The present invention is suitable in particular for the exhaust gas cleaning of diesel engines, in which oxidizable gaseous components are firstly converted and then particles are filtered out with a particle filter. If the operating temperature of the particulate filter does not reach the temperature necessary for burning-off over relatively long time periods, the burning-off of collected particulates must be triggered by additional heating, for which the device according to the invention is particularly suitable. Completely homogeneous heating is not required, since in partial-regions, the ignited particulates can also ignite adjoining regions. It is therefore more favorable to generate hot partial-streams with an effective use of electrical energy than to heat up the entire flow cross section homogeneously.

We claim:

1. A device for cleaning exhaust gas from an internal combustion engine, comprising:

a casing tube;

at least one catalyst carrier body configured to conduct exhaust gas in a flow direction, said at least one catalyst carrier body disposed in said casing tube and having a honeycomb structure;

an electrically heating honeycomb body disposed downstream of said at least one catalyst carrier body in the exhaust gas flow direction, said honeycomb body having ends and power connections each disposed at a respective one of said ends, said honeycomb body defining a twisting current path over an electrically isolating gap, said honeycomb body having a first cross-sectional area, said gap having a second cross-sectional area, and said first and second cross-sectional areas being in a ratio of less than 2; and electrically insulating supporting elements fastening said honeycomb body to said at least one catalyst carrier body.

2. The device according to claim 1, wherein said current path of said honeycomb body has an approximately meander shape.

3. The device according to claim 1, wherein said current path of said honeycomb body has an approximately spiral shape.

4. The device according to claim 1, wherein said ratio of said first cross-sectional area to said second cross-sectional area is smaller than 1.

5. The device according to claim 1, wherein said gap has a width remaining substantially constant over its entire extent.

6. The device according to claim 1, wherein said gap has a width increasing in direction of said casing tube.

7. The device according to claim 1, wherein said supporting elements are distributed at approximately equal intervals over said current path.

8. The device according to claim 1, including a catalytically active layer on said honeycomb body.

9. The device according to claim 1, wherein said honeycomb body and said at least one catalyst carrier body have honeycombs, and said honeycombs of said honeycomb body are smaller than said honeycombs of said at least one catalyst carrier body.

10. The device according to claim 1, wherein said honeycomb body and said at least one catalyst carrier body have honeycombs, and said honeycombs of said honeycomb body and said honeycombs of said at least one catalyst carrier body are the same size.

11. The device according to claim 1, including a further honeycomb body disposed downstream of said electrically heating honeycomb body in the exhaust gas flow direction.

12. The device according to claim 1, including a particulate filter disposed downstream of said electrically heating honeycomb body in the exhaust gas flow direction.

13. A device for cleaning exhaust gas from a diesel engine, comprising:

a casing tube;

at least one catalyst carrier body configured to conduct exhaust gas from the diesel engine in a flow direction, said at least one catalyst carrier body disposed in said casing tube and having a honeycomb structure;

an electrically heating honeycomb body disposed downstream of said at least one catalyst carrier body in the diesel engine exhaust gas flow direction, said honeycomb body having ends and power connections each disposed at a respective one of said ends, said honeycomb body defining a twisting current path over an electrically isolating gap, said honeycomb body having a first cross-sectional area, said gap having a second cross-sectional area, and said first and second cross-sectional areas being in a ratio of less than 2; and electrically insulating supporting elements fastening said honeycomb body to said at least one catalyst carrier body.

* * * * *